United States Patent [19]

Crump

[11] 4,256,170
[45] Mar. 17, 1981

[54] HEAT EXCHANGER

[76] Inventor: Robert F. Crump, 1503 Thackeray Dr., Louisville, Ky. 40205

[21] Appl. No.: 59,378

[22] Filed: Jul. 20, 1979

[51] Int. Cl.³ .............................................. F28D 7/10
[52] U.S. Cl. ...................................... 165/1; 165/146; 165/154
[58] Field of Search .................. 165/1, 146, 154, 156, 165/169

[56] References Cited

U.S. PATENT DOCUMENTS

| | | | |
|---|---|---|---|
| 1,024,436 | 4/1912 | Cartault | 165/154 |
| 2,397,208 | 3/1946 | Saco et al. | 165/154 |
| 2,661,934 | 12/1953 | Stutz | 165/154 |
| 3,453,840 | 7/1969 | Nagakura et al. | 165/154 |
| 3,777,502 | 12/1973 | Michie et al. | 165/154 |

Primary Examiner—Sheldon J. Richter
Assistant Examiner—Margaret A. Focarino
Attorney, Agent, or Firm—Wood, Herron & Evans

[57] ABSTRACT

A liquid-to-liquid heat exchanger particularly adapted for exchanging heat from hot waste water to cold supply water. In preferred form, the heat exchanger is of the inner pipe and outer shell type in which the outer shell is sub-divided into a serpentine flow path for the cold water, and in which the inner pipe is sized so that flow of the hot water liquid therethrough normally does not fill the pipe when the pipe is horizontally disposed. The outer shell's serpentine path is comprised of a first passageway located entirely beneath the normal flow of the hot water through the pipe, and dual second passageways located on either side of and parallel to the first passageway. Flow of the cold water in the outer shell commences through the first passageway, then splits and reverses directions through the dual second passageways, thereby providing optimum heat transfer between the hot and cold water when the pipe is less than full of hot water.

8 Claims, 3 Drawing Figures

HEAT EXCHANGER

This invention relates to heat exchangers. More particularly, this invention relates to a liquid-to-liquid heat exchanger.

In commercial and residential installations where hot water is used, that water is often discharged while still hot to a waste water drain line. This is often the case, for example, with commercial dishwashers in restaurants, and with commercial washing machines in laundromats. In such circumstances, therefore, the heat in the waste water is lost when the hot waste water is discharged through the drain line to sewer. In recent years it has become more and more desirable to attempt to reclaim heat from hot waste water in light of continuously increasing energy costs.

In general, such hot water drain lines are significantly less than full when hot waste water is drained therethrough. In other words, it is often the case that the horizontal sections of hot waste water drain lines are no more than about one-half full when hot waste water from, e.g., the commercial dishwasher or commercial washing machine, flows therethrough to sewer. Accordingly, it has been the primary objective of this invention to provide a novel and improved liquid-to-liquid heat exchanger which provides optimum heat transfer to a cold supply water flow from a hot waste water flow and, particularly, from a drain line where the hot waste water flow does not normally fill more than about one-half a horizontally disposed pipe section in that drain line. In accord with this objective, the liquid-to-liquid heat exchanger of this invention, in preferred form, is of the inner pipe and outer shell type in which the outer shell is sub-divided into a serpentine flow path for the cold water, and in which the inner pipe is sized so that flow of the hot water liquid therethrough normally does not fill the pipe when the pipe is horizontally disposed. The outer shell's serpentine path is comprised of a first passageway located entirely beneath the normal flow of the hot water through the pipe, and dual second passageways located on either side of and parallel to the first passageway. Flow of the cold water in the outer shell commences through the first passageway, then splits and reverses directions through the dual second passageways, thereby providing optimum heat transfer between the hot and cold water when the pipe is less than full of hot water.

Liquid-to-liquid heat exchangers, of course, are very well known to the prior art. But normal liquid-to-liquid heat exchangers are sized so that the hot and cold liquids completely fill the respective separate passageways of those heat exchangers. In substance, and in the prior art heat exchangers, therefore, substantially uniform heat transfer takes place on substantially all surfaces of the separate passageways. The liquid-to-liquid heat exchanger of this invention, on the other hand, is particularly adapted for use in those situations where heat transfer is desired between first and second liquids, but where one of the heat exchanger's passageways is normally only partly full, and such as is usually the case in hot waste water discharge or drain lines connected to sewer.

Other objectives and advantages of this invention will be more apparent from the following detailed description taken in conjunction with the drawings in which.

Figure 1:
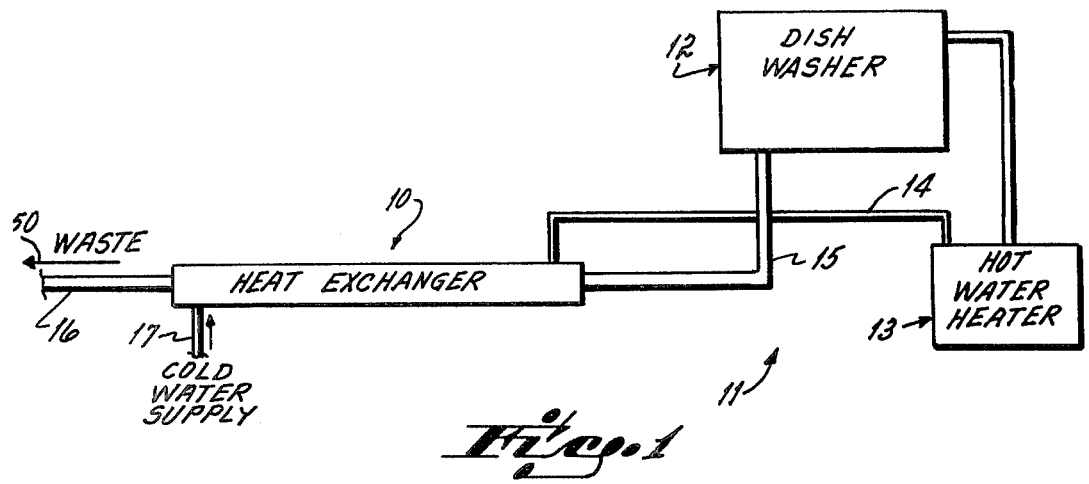
FIG. 1 is a diagrammatic view illustrating a liquid-to-liquid heat exchanger in accord with the principles of this invention, the exchanger being shown in a piping system that includes a commercial dishwasher.

A liquid-to-liquid heat exchanger 10 in accord with the principles of this invention is illustrated in a piping system 11 that incorporates a commercial dishwasher 12 and hot water heater 13 as illustrated in FIG. 1. The dishwasher discharges its hot waste water (a first liquid) through drain line 15 which is connected to the heat exchanger 10. The hot waste water is discharged from the heat exchanger into sewer line 16. The cold supply water (a second liquid) for the hot water heater 13 is introduced initially into the heat exchanger 10 from a source, not shown, through the supply line 17, and is preheated in that heat exchanger. The preheated supply water is transferred to the hot water heater 13 through feed line 14. In this system, therefore, hot waste water from the dishwasher 12 serves to preheat the cold supply water prior to introduction of that supply water into the hot water heater 13. This heat exchanger 10, therefore, reduces the amount of heat to be supplied by the hot water heater 13 to bring the hot water up to the temperature desired for use in the dishwasher 12. Use of the heat exchanger 10 of this invention will permit use of a hot water heater 13 having a lower recovery rate as compared to the hot water heater that must be used where no such heat exchanger is used.

Figure 2:
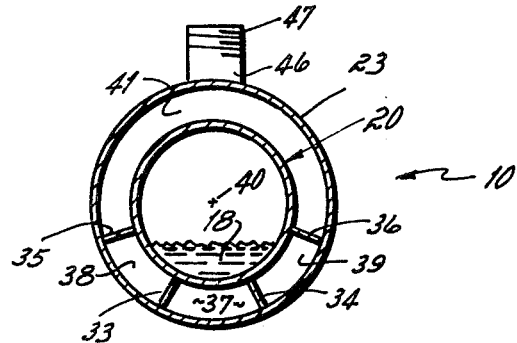
FIG. 2 is a cross-sectional view of the liquid-to-liquid heat exchanger illustrated schematically in FIG. 1.
Figure 3:
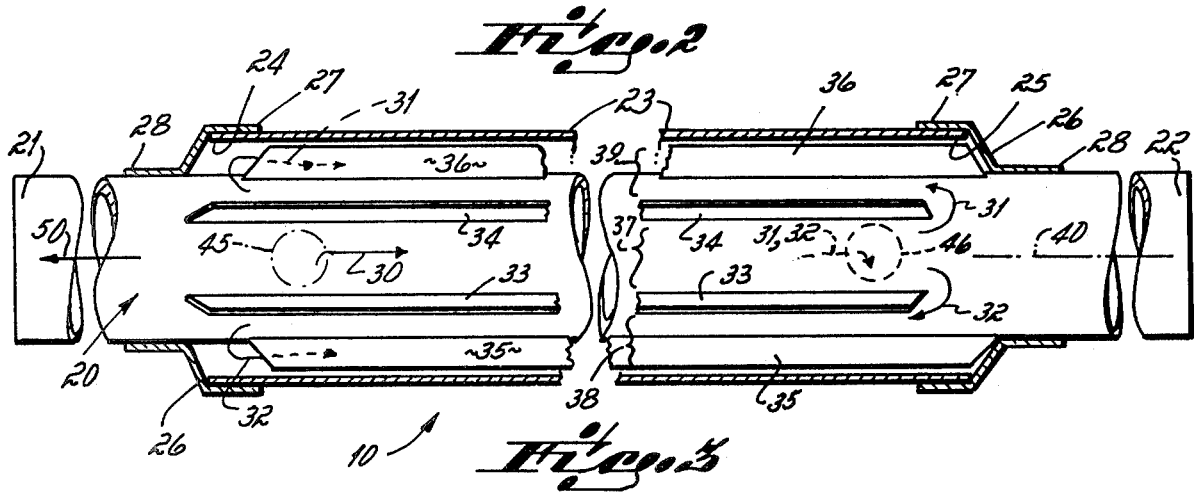
FIG. 3 is a bottom view of the heat exchanger illustrated in FIG. 2 with a portion of the outer shell removed for clarity.

The structure of the heat exchanger 10 itself is particularly illustrated in FIGS. 2 and 3. As shown in those figures, the heat exchanger 10 is comprised of an inner pipe 20 sized and configured identically to the drain line 15 and the sewer line 16 so that flow of the hot waste water from the dishwasher 12 through the drain line 15, through the heat exchanger 10, and through the sewer line 16 is not impeded. The pipe 20, therefore, is adapted to interconnect with drain 15 and sewer 16 lines at its opposed ends 21, 22. Further, and as particularly shown in FIG. 2, note the inner pipe 20 is sized so that flow of hot waste water therethrough (as shown at 18 in FIG. 2) normally does not fill the pipe and, as illustrated, may even fill less than one-half the pipe. This drain line 15, sewer line 16 sizing is normally the case with waste water discharge piping.

An outer cylindrical shell 23 is mounted to and spaced from the pipe 20 in concentric fashion. The outer shell 23 is fixed to the pipe at each end 24, 25 by reducer fittings 26 which are soldered to the shell at outer flanges 27, and soldered to the pipe at inner flanges 28. Note that the outer shell 23 is of a length less than the length of the inner pipe 20 on which it is fixed.

The novel feature of this fluid-to-fluid heat exchanger is the flow path 30-32 of cold supply water between the outer shell 23 and the inner pipe 20, see FIGS. 2 and 3. This flow path 30-32, which is of a generally serpentine configuration, is defined by fins 33-36. A first pair of the fins 33, 34 is mounted in heat exchange relation with the pipe, that first fin pair defining a first passageway 37 which extends from one end 24 of the outer shell 23 to the other end 25. A second pair of fins 35, 36 cooperate to define a second dual passageway 38, 39 also mounted in heat exchange with the pipe. Note each of the dual passageways 38, 39 is located on one side of and immediately adjacent to the first passageway 37 since one fin 35 of the second fin pair 35, 36 is located outboard of one fin 33 of the first fin pair 33, 34 and the other fin 36 of the second fin pair is located outboard of the other fin 34 of the first fin pair. Since the fins 33-36 extend generally parallel to the longitudinal axis 40 of the pipe 20, the passageways 37-39 are also so oriented. The fins 33-36, which preferably are of copper, are initially soldered to the pipe 20, which also preferably is of copper, in the desired location with the outer shell 23 being slip-fit thereover to define the first 37 and second 38, 39 passageways. Note particularly, as shown in FIG. 2, that the first passageway 37 is located entirely beneath the normal flow 18 of the hot waste water through the pipe 20. Note also that both of the second passageways 38, 39 extend partially beneath the normal flow 18 of hot waste water through the first pipe 20, and also partially above that flow. In effect, therefore, the outer shell 23 is divided into a first passageway 37 and two separate second passageways 38, 39 which comprise generally the bottom half of the annulus defined by the shell 23 and the pipe 20 when viewed in cross-section. This leaves the top half of the annulus between the shell 23 and the pipe 20 to define a single third arcuate passageway 41 which is located entirely above the normal flow 18 of hot waste water through pipe 20.

The first 37 and second 38, 39 passageways cooperate, as shown in FIG. 3, to channel the cold supply water through the shell 23 in a generally serpentine path between the ends 24, 25 of the outer shell. In this connection, water flow in the first passageway 37 is through a single passageway as shown by flow lines 30 in FIG. 3. The water flow splits at the end of the first passageway 37 and reverses direction to flow into two separate streams 31, 32 through the dual second passageways 38, 39. When the supply water or second fluid flow reaches the end of the dual second passageways 38, 39, same reverses direction once again and the dual streams 31, 32 are reunified in a common flow direction in the third or discharge passageway 41. In this connection, a fluid inlet port 45 is connected to the first passageway 37 at that end of the first passageway not connected to the second passageways 38, 39. Further, a fluid outlet port 46 is connected to that end of the third passageway 41 not fluid connected to the second passageways 38, 39. Each of the inlet 45 and outlet 46 fluid ports, as illustrated in FIG. 2, is simply in the nature of a fitting soldered to the outer shell 23 and provided with threads 47 on the outer end thereof for connection with the water lines 14, 17.

It is preferred that, relative to the direction of the hot waste water through pipe 20 as illustrated by flow arrow 50 in FIG. 3, the initial pass of the cold supply water through the first passageway 37 should be in the counter-flow direction. The second or reverse pass of the supply water through the second passageways 38, 39 will then be in the same direction as the flow 50 of the hot waste water through the pipe 20. Subsequently, the third pass of the supply water through third passageway 41 will be reversed relative to the second pass through second passageways 38, 39, and will be in a counter-flow direction relative to the hot waste water flow 50. This first counter-flow, and then reverse to same flow and then reverse to counter-flow once again, direction of the cold supply water through the heat exchanger 10 in effect provides a serpentine flow path that is relatively parallel to axis 40 of the heat exchanger 10 between the inlet port 45 and the outlet port 46, thereof. The cold supply water, which has now been pre-heated, is thereafter directed from outlet port 46 to hot water heater 13.

In one preferred form of this invention, and in a commercial dishwasher 12 environment, it has been found that a liquid-to-liquid heat exchanger in which the outer shell 23 has a three-inch inside diameter, the pipe 20 has a two inch inside diameter, the inlet 45 and outlet 46 fittings have a three-quarter inch inside diameter, and with the shell having an overall length of about five feet, constitutes a reasonably practical unit where the pipe, shell and fins 33-36 are fabricated of copper.

It will be understood by those skilled in the art that heat transfer between the hot waste water flow 50 and the supply water flow 30-32 may be varied by the sizing of the first passageway 37 and the two reverse passageways 38, 39 relative one to the other, it being preferred that the cross-sectional area of the first passageway be less than the combined cross-sectional area of the two reverse passageways. Further, it will be understood by those skilled in the art that heat transfer from the hot waste water to the cold supply water is provided not only through direct heat exchange relation due to contact of the supply water with the outer surface of the pipe 20, but also heat is conducted into fins so that heat is transferred from the fins, too. It will be additionally understood by those skilled in the art that heat transfer between the hot waste water and the cold supply water can be controlled by the velocity of the supply water through the shell 23, as well as by turbulence of the supply water within the shell. Turbulence of the supply water within the first 37 and second 38, 39 passageways can be induced, e.g., by undulating or otherwise slightly deforming the fins 33-36 which form passageways 37-39.

Having described in detail the preferred embodiment of my invention, what I desire to claim and protect by Letters Patent is:

1. A liquid-to-liquid heat exchanger comprising
an inner pipe adapted to be horizontally oriented in a piping system, said inner pipe being sized so that flow of a first liquid therethrough normally does not fill said pipe when said pipe is horizontally disposed,
a first passageway formed in heat exchange relation with said pipe to permit flow of a second fluid therethrough, said first passageway being located generally parallel to the longitudinal axis of said pipe and entirely beneath the normal flow of said first liquid through said pipe, said first passageway directing the flow of said second fluid in one of the same and counter-flow directions relative to the flow direction of said first fluid through said pipe,
at least one second passageway formed in heat exchange relation with said pipe adjacent said first passageway, said first passageway being fluid connected at one end only to said second passageway, said second passageway also extending generally parallel to the longitudinal axis of said pipe, and
said second passageway directing the flow of said second fluid in the other of the same and counter-flow directions relative to the flow path of said first fluid through said pipe, thereby providing heat transfer between first and second fluids of different temperature as the first fluid flows in a generally linear flow path from one end of said pipe to the other and as the second fluid flows in a generally serpentine flow path through said first and second passageways.

2. A liquid-to-liquid heat exchanger as set forth in claim 1, said heat exchanger further comprising
dual second passageways, said dual second passageways being located on opposite sides of said first passageway, the single flow path of said second fluid through said first passageway being split at the outlet end of said first passageway into dual flow paths through said dual second passageways.

3. A liquid-to-liquid heat exchanger as set forth in claim 2, said heat exchanger further comprising
a third passageway formed in heat exchange relation with said pipe to permit flow of said second fluid therethrough, said third passageway being connected with said second passageways at one end only so that flow of said second fluid therethrough is in a direction reverse to the flow of said second fluid in said second passageways.

4. A liquid-to-liquid heat exchanger as set forth in claim 2, said heat exchanger further comprising
an outer shell mounted to and spaced from said pipe section, opposed ends of said shell being connected to said pipe in fluid tight relation, and
at least three fins mounted in heat exchange relation to said pipe, said fins being oriented generally parallel to the longitudinal axis of said pipe, and said fins cooperating with said pipe and said shell to define said first and second passageways.

5. A liquid-to-liquid heat exchanger as set forth in claim 2, said heat exchanger further comprising
a fluid inlet port connected to said first passageway, said inlet port being located so that flow of said second fluid through said first passage is in a counter-flow direction relative to the flow of said first fluid through said pipe.

6. A liquid-to-liquid heat exchanger as set forth in claim 5, said pipe being sized the same as a hot waste water drain line, and said fluid inlet port being adapted to connect with a cold water supply line.

7. A method of pre-heating cold water flowing in a cold water supply line by extracting heat from hot waste water flowing in a waste water drain line, said method comprising the steps of
orienting a section of said drain line in a substantially horizontal position,
flowing hot waste water through said horizontal drain line section in a volume less than that required to fill said drain line section, said hot waste water flowing therethrough over no more than about the bottom one-half portion of said drain line,
passing water from a cold water supply in a first pass in heat exchange relation with a longitudinal portion of the bottom surface of said drain line section, said cold water first pass being made in a flow direction counter to the flow direction of said hot waste water, and being made through a passageway entirely beneath the flow of said hot waste water, passing through said drain line section, and
thereafter reversing said cold water flow and passing said cold water in a second pass in heat exchange relation with said same drain line section, said second pass being made in a flow direction the same as the flow direction of said hot waste water.

8. A liquid-to-liquid heat exchanger as set forth in claim 7, said method further comprising the step of
splitting said cold water flow at the end of said first pass, said second pass being made through dual passageways each of which is at least partially beneath the flow of hot waste water passing through said drain line section.

* * * * *